United States Patent Office 3,517,433
Patented June 30, 1970

3,517,433
METHOD FOR ASSEMBLING UNIVERSAL JOINTS
Alfred Pitner, Paris, France, assignor of one-half to Nadella S.A., Rueil-Malmaison, France, a French body corporate
Filed Feb. 20, 1967, Ser. No. 617,129
Claims priority, application France, Feb. 23, 1966, 50,711
Int. Cl. B23p *19/00;* B23q *3/00*
U.S. Cl. 29—434                                3 Claims

ABSTRACT OF THE DISCLOSURE

The method concerns ensuring that the axis of the shaft to which a fork of a universal joint is connected intersects the common axis of one of the pairs of journals of the cross member of the universal joint, by means of a fixture supporting the shaft and comprising two U- or V-shaped centering elements which directly engage the pair of journals and hold their common axis in a plane containing the axis of the shaft while the other pair of journals are fixed in position in the corresponding bores of the fork, of which the following is a specification.

---

The present invention relates to the assembly of universal joints comprising needle cups which cap the journals of a cross member and are secured in smooth bores in forks or jaws connected to shafts or other transmission means.

One of the problems met with by construction of such universal joints is to avoid the necessity of machining high-precision reference surfaces which are in any case liable to result—owing to the addition of the tolerances of the various parts to be assembeld—in wide variations as concerns off-centre or concentricity in the final assembly.

Various solutions to this problem have been proposed and in particular the following:

(a) Additional grooves are provided without precision in each cup and in the corresponding jaw and a plastics material is injected into the grooves so as to hold the cups stationary relative to the jaws.

(b) The cups, retaining elements for the latter or auxiliary reinforcing elements, are fixed in the desired position in the bore by means of projections formed from the metal of the bore.

(c) According to the teaching of the French Pat. No. 1,246,908 filed on Oct. 15, 1959 and of the French Addition No. 76,965 filed on Oct. 21, 1959 to which corresponds the U.S. Pat. No. 3,062,026 (Pitner) the retaining element itself cuts, in the required region in the bore, the hollow or projecting portions which retain the retaining element, the latter performing the treble function of abutment means for the cup, reinforcement for the end wall of the cup and cutting tool for its retainment in the bore.

By means of either of these methods, it is possible to produce, with the use of the apparatus described in French Pat. No. 1,382,264 filed on Nov. 5, 1963, universal joints devoid of axial clearance on the bearing faces for the needles. This affords various operational advantages, in particular less wear of the parts in contact, and permits a maximum reduction in the non-circular configuration or out-of-balance of one of the jaws with respect to the other, which could eliminate additional balancing operations which would be necessary in the most usual case.

However, it must be mentioned that the means discussed hereinbefore do not take into account the fact that it is important not to consider the final non-circular configuration but the effective position of the instantaneous centres of rotation and oscillation. In other words, these means do not guarantee in themselves a strict coincidence between the centre of the universal joint, defined as the meeting point of the axes of the bores of the respective jaws, and the axis of the shaft to which the jaw is connected.

This can be explained with reference to the accompanying diagrammatic FIGS. 1 and 2, the first of which shows a jaw 1 connected to an input shaft 2 and forming part of a universal joint 3 connecting this shaft to one of the ends of an inclined transmission shaft 4, the other end of which is supposed to be itself connected to an output shaft by another universal joint. In practice, moreover, the transmission shaft in some cases constitutes this output shaft (for example intermediate transmission bearing having three joints). In this drawing, in which A designates the centre of the universal joint 1, that is, practically the centre of the cross member, and B the meeting point between the axis XX′ of the input shaft and the plane of this cross member, the distance *a* between A and B represents a centering defect or an off-centre (exaggerated for the sake of clarity).

The diagram shown in FIG. 2, in which it is assumed for example that an identical offset in the same direction exists between the second universal joint and the output shaft, shows that in the course of the operation of the transmission system the axis of the transmission shaft does not turn about itself but generates in this particular case a cylinder of revolution having a radius approximately equal to *a* and an apparent contour defined by the generatrices $A_1A_2$, $A'_1A'_2$ corresponding to the extreme positions of the movements of the centres of the two universal joints about the points $B_1B_2$. It is seen from the diagram shown in FIG. 2, and confirmed experimentally, that axial movements of noticeable amplitude occur at the frequency of a to-and-fro movement per revolution of the shaft. Thus, for an off-centre *a* of 0.1 mm. and an angle $\alpha$ of 10°, there is an alternating axial movement of amplitude *b* of 0.036 mm., whereas the radial variation in the off-centre is practically negligible.

When the direction of the off-centre of the universal joints at the end of the transmission shaft is different, as opposed to the case shown in FIG. 2 in which this direction is the same, there occurs, for each revolution, alternately an extension and a compression of the transmission shaft instead of an overall alternating movement of the transmission shaft 4.

These variations are not compensated by sliding in the splining usually employed in the assembly of the transmission shaft, since the torques transmitted are such and the friction sufficiently high that any sliding is precluded so that the oscillating phenomenon is transmitted to the support points and creates noise, if not fatigue in the elements of the support points, in particular the rolling or other bearings.

The object of the invention is to provide a method for assembling a universal joint which avoids the aforementioned defects without the use of close machining tolerances for the parts, this method making it possible to make the most of the known assembling methods mentioned at the beginning or like methods, in which the universal joint elements are fixed in the desired position in the directions of the bores in the jaws.

This method is more particularly applicable to the case in which one of the jaws, namely the end jaw, is connected to, or forms part of a shaft supported by bearings which determine its axis of rotation, whereas the other jaw is connected to a shaft which is supported at the end adjacent this jaw by the universal joint and at the other end by a point support, such as another universal joint.

This method comprises engaging two opposed first journals of the cross member in bores in the end fork or jaw, disposing the common axis of the two other journals in intersecting relation to the reference axis or axis of rotation of said end jaw and fixing in position two needle cups surrounding the two first journals in position in the corresponding bores while maintaining said common axis of said two other journals in a plane containing said axis of rotation of said end jaw. There is preferably created between the cup end walls and the corresponding journal faces zero clearance or a negative clearance which is produced by the elastic deformation of the two branches of the jaw before fixing and then their release after fixing the cups holding the cross member in the known manner.

If care has been taken to form between the jaw and the shaft supporting it in an assembly which ensures a minimum off-centre of the bore with respect to the axis of the shaft or better still, to eliminate this assembly, two pivot axes are thus defined which are substantially perpendicular, owing to the construction of the cross member, and which have a minimum off-centre relative to the reference axis of rotation. In this way, a pivot point is defined whose variations about the axis of the input shaft are reduced which decreases the longitudinal movements of the intermediate shaft, to which the second jaw is connected, to such value that, as concerns angles occurring in practice, their effects are negligible.

For mounting this second jaw, one of the aforementioned methods or a like method is employed, preferably by separating the branches of the jaw so as to eliminate any axial clearance on the end faces of the cross member and to have consequently for the intermediate shaft connected to this second jaw, a stable connection with the pivot point determined by the preceding operation which affords a constant off balance which can moreover be reduced before any balancing operation by the prior centering of the intermediate shaft, if desired with the use of devices such as those described in the French Pat. No. 1,382,264.

Further features and advantages of the invention will be apparent from the ensuing description with reference to FIGS. 3–6 of the accompanying drawing in which.

Figure 3:
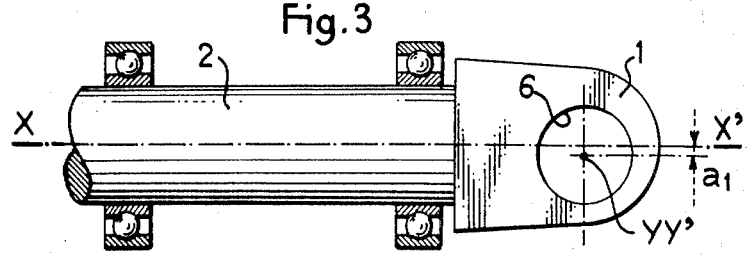
FIG. 3 is a view of an end jaw or fork on an input shaft, the bores of this jaw being viewed in end elevation.

FIG. 3 shows an end jaw or fork 1 meeting the requirements of a precise assembly. By way of example, by which the invention is not intended to be limited, this jaw is shown as being directly mounted on a shaft 2 so as to avoid the accumulation of the tolerances resulting from the use of a coupling plate. It will be understood that this shaft defines the axis of rotation of the jaw 1 in joint operation. The dimension $a_1$ designates the distance between the axis XX' of the shaft 2 and the axis YY' defined by the bores 6 of the jaw 1 and clearly indicates the off-centre or off-set which should be made as small as possible, by employing appropriate coupling and machining means, so as to achieve maximum efficiency of the subsequent operations.

Figure 4:
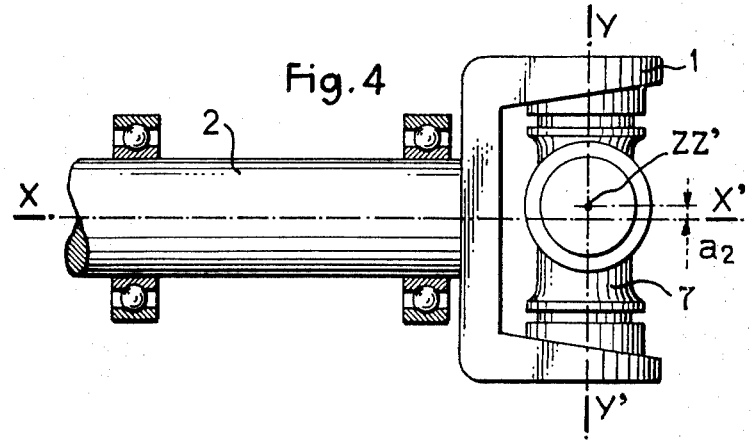
FIG. 4 is a view of the jaw shown in FIG. 3, taken at right angles to the plane of the latter, the cross member being in position.

The same jaw or fork 1, equipped with a cross member 7, is shown in FIG. 4 after a rotation through 90° and the dimension $a_2$ designates the distance between the axis XX' of the shaft 2 and the axis ZZ' intersecting the centre of the cross member and perpendicular to the axis YY', that is, an off-centre which the present invention aims precisely at reducing as far as possible to zero.

Figure 5:
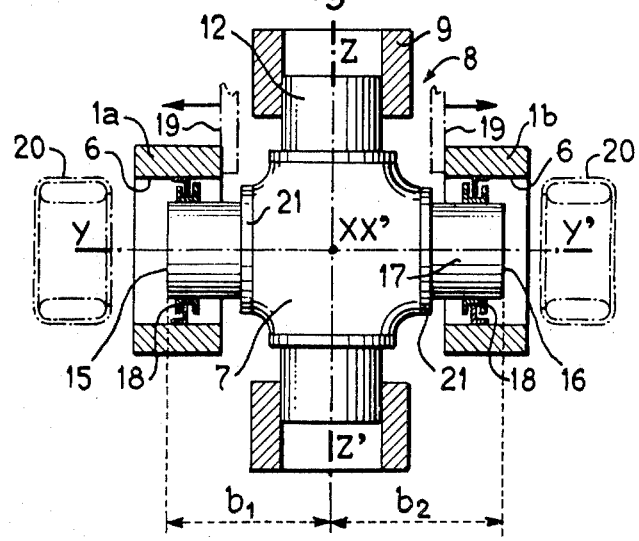
FIG. 5 is an end elevational view of the jaw shown in FIG. 4.

This is achieved in the example shown in FIG. 5 by means of a fixture or holding device 8 comprising two U- or V-shaped centering elements or locating means 9, 9 which define an axis coinciding with the axis ZZ' of the cross member 7 which is exactly in a plane containing the axis XX' (as far as manufacturing precision allows).

Figure 1:
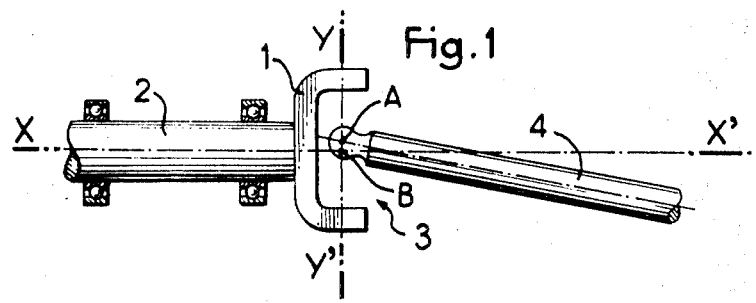
Figure 2:
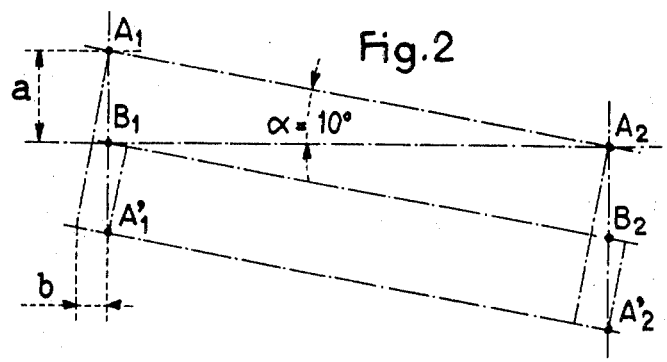
Figure 6:
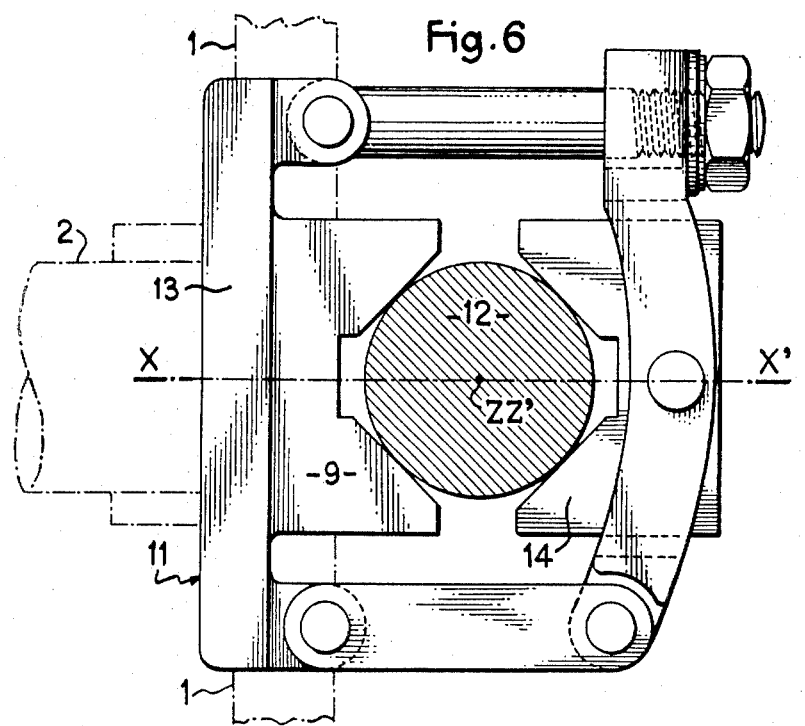
FIG. 6 is a diagrammatic view of a possible embodiment of the means for eliminating any off-centre between the axis of the shaft of the jaw or fork and the axis of the cross member which is prependicular to the axis defined by the bores of the jaw.

An embodiment of the fixture 8 is shown in FIG. 6. It comprises of a support 11 which receives the stem of the jaw or fork 1 forming the shaft 2, a plate 13 to which the V-shaped elements 9 are secured. The bearing-receiving journals 12 of the cross-member 7 are clamped by a movable clamp jaw 14 having a complementary shape.

It will be noticed that the end faces 15 and 16 of the bearing-receiving journals 17 of the cross member are slightly asymmetrical ($b_2$–$b_1$) relative to the axis ZZ', which clearly shows that, firstly owing to the method according to the invention, it is in no way necessary to employ close tolerances, apart from the diameters of the journals and the bores, for the elements other than the end jaw 1 (off-centre $a_1$) and, secondly, the only thing that counts, for constructing the elements and the fixture and then the assembly, is the precise meeting of the axis ZZ' with the axis XX' (ensured by the fixture). In particular, in order to avoid a close tolerance in the perpendicularity between the axis ZZ' and YY' for machining the cross member, it is mentioned that the pair of U- or V-shaped elements could be movable about the axis XX'.

The holding in position transversely of the axis YY' is achieved by two sealing rings 18 located substantially in the middle of the bearing cooperating faces of the journals 17 so as to show clearly that, in this direction, a slight difference in the concentricity in the course of assembly is of no importance, the disclosed method affording on the other hand the advantage of enabling the needle cup and the retaining element therefor to be put in position in a single operation, as described in the French patent application No. 44,933 filed on Jan. 5, 1966, which also shows sealing rings identical to the rings 18, comprising a flexible double-lipped ring and a rigid L-section ring.

The jaws of a device for separating the branches $1a$ and $1b$ of the jaw or fork 1, in the direction of the arrows, are shown symbolically at 19 (FIG. 5), this device being adapted to create zero or a slightly negative clearance between the end faces 15 and 16 of the journals and the corresponding cup end walls, and being if desired of a type similar, as concerns its principle of operation, to that shown in FIGS. 11 and 12 of the French Pat. No. 1,382,264.

It is also, in following the teaching of the last-mentioned patent, that the needle cups 20 are placed in position by means of the assembly shown in FIG. 5, the cups, sliding axially along and around the journals, urging the sealing rings 18 back to their final position in which they bear against shoulders 21 of the cross-member, in respect of which placing in position the retaining elements of the cups are fixed in the bores 6 of the jaw in a nonvariable manner.

After this placing in position, the device 8 holding the cross member is disengaged and the second jaw or fork is mounted, the second pair of needle cups being placed in position in the bores of this second jaw under the same conditions as the first pair.

Although specific embodiments of the invention have been described, many modifications and changes may be made therein without departing from the scope of the invention as defined in the appended claims.

Having now described my invention what I claim as new and desire to secure by Letters Patent is:

1. A method for assembling a universal joint fork having two branches and two coaxial bores respectively provided in said branches, and a cross member having a first pair of coaxial journals and a second pair of coaxial journals substantially orthogonal to said first pair of journals, with interposition of bearing cups capping said first pair of journals and engaged in said bores, each of said journals having a cylindrical face suitable for cooperation with a journal bearing and an end face extending radially of the cylindrical face, said fork being integral with an element defining an axis of rotation of said fork, said method comprising engaging said first pair of journals in said two bores of said fork, mounting said element on a fixture which includes means receiving said element and locating and clamping means, and directly engaging and locating and clamping said cylindrical faces of said second pair of journals in said clamping means so that the common axis of said second pair of journals is located in a plane containing said axis of rotation of said fork, and fixing said cups in capping relation to said first pair of journals in position in said bores while maintaining said common axis of said second pair of journals in said plane.

2. A method as claimed in claim 1, further comprising ensuring that there is no clearance between said end walls of said cups and the corresponding end faces of said first pair of journals.

3. A method as claimed in claim 1, further comprising the steps of elastically moving apart the two branches of said fork before fixing said cups in position in said bores and then releasing said two branches after the cups have been fixed in position.

References Cited
UNITED STATES PATENTS

| | | | |
|---|---|---|---|
| 2,238,335 | 4/1941 | MacGregor | 29—438 |
| 2,976,091 | 3/1961 | Miller. | |
| 3,062,026 | 11/1962 | Pitner. | |
| 3,178,907 | 4/1965 | Lyons. | |
| 3,218,692 | 11/1965 | Kayser. | |
| 3,230,617 | 1/1966 | Spiess et al. | 29—434 |
| 3,237,291 | 3/1966 | Kelso | 29—201 |

JOHN F. CAMPBELL, Primary Examiner

V. A. DiPALMA, Assistant Examiner

U.S. Cl. X.R.

29—464